United States Patent
Hida et al.

(10) Patent No.: US 12,129,409 B2
(45) Date of Patent: Oct. 29, 2024

(54) REACTIVE SILICONE COMPOSITION AND CURED PRODUCT THEREOF

(71) Applicant: NISSAN CHEMICAL CORPORATION, Tokyo (JP)

(72) Inventors: Masahiro Hida, Funabashi (JP); Shuhei Yamada, Funabashi (JP); Masashi Abe, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 728 days.

(21) Appl. No.: 17/295,546

(22) PCT Filed: Nov. 1, 2019

(86) PCT No.: PCT/JP2019/043076
§ 371 (c)(1),
(2) Date: May 20, 2021

(87) PCT Pub. No.: WO2020/105405
PCT Pub. Date: May 28, 2020

(65) Prior Publication Data
US 2022/0010176 A1 Jan. 13, 2022

(30) Foreign Application Priority Data
Nov. 21, 2018 (JP) .................... 2018-218291

(51) Int. Cl.
C09J 7/38 (2018.01)
C09J 7/10 (2018.01)
G02B 1/11 (2015.01)

(52) U.S. Cl.
CPC . C09J 7/38 (2018.01); C09J 7/10 (2018.01); G02B 1/11 (2013.01); *C09J 2483/00* (2013.01)

(58) Field of Classification Search
CPC ... G02B 1/11–1/115; G02B 6/00–6/567; C09J 183/04–183/16; C09J 7/38; C08F 230/085
See application file for complete search history.

(56) References Cited

U.S. PATENT DOCUMENTS

| | | | |
|---|---|---|---|
| 2014/0051821 A1* | 2/2014 | Popall | C08G 77/20 528/25 |
| 2014/0199554 A1* | 7/2014 | Koyama | C09D 5/00 106/287.19 |
| 2015/0286018 A1* | 10/2015 | Lee | G02B 6/43 385/14 |

FOREIGN PATENT DOCUMENTS

| | | |
|---|---|---|
| EP | 2 527 293 A1 | 11/2012 |
| JP | H11-61081 A | 3/1999 |
| JP | 2010-132576 A | 6/2010 |
| JP | 2014-510159 A | 4/2014 |
| WO | 2012/165620 A1 | 12/2012 |
| WO | 2015/115377 A1 | 8/2015 |
| WO | 2017/170275 A1 | 10/2017 |
| WO | 2017/170385 A1 | 10/2017 |

OTHER PUBLICATIONS

May 10, 2023 Office Action issued in Japanese Patent Application No. 2020-558227.
Mar. 7, 2023 Office Action issued in Taiwanese Patent Application No. 108140775.
Jul. 28, 2022 extended Search Report issued in European Patent Application No. 19886891.1.
Feb. 4, 2020 Search Report issued in International Patent Application No. PCT/JP2019/043076.
Feb. 4, 2020 Written Opinion of the International Searching Authority issued in International Patent Application No. PCT/JP2019/043076.
Nov. 14, 2023 Office Action issued in Taiwanese Patent Application No. 108140775.
Nov. 6, 2023 Communication Pursuant to Article 94(3) EPC issued in European Patent Application No. 19 886 891.1.
Feb. 24, 2024 Office Action issued in Chinese Patent Application No. 201980076624.2.

(Continued)

*Primary Examiner* — Prashant J Khatri
(74) *Attorney, Agent, or Firm* — Oliff PLC

(57) ABSTRACT

A reactive silicone composition including component (S) and component (T) below, the component (S): a reactive silicone compound including a condensation product of a diaryl silicate compound represented by Formula [1] and a silicon compound represented by Formula [2],

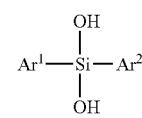

[1]

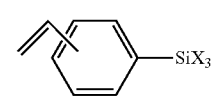

[2]

(wherein $Ar^1$ and $Ar^2$ each independently represent a phenyl group optionally substituted by a $C_{1-6}$ alkyl group and X represents a hydrolyzable reactive group), the component (T): modified titanium oxide-containing oxide colloidal particles produced by bonding an organosilicon compound to surfaces of titanium oxide-containing oxide colloidal particles (C) having an average particle diameter of from 2 to 100 nm and including, as a core, titanium oxide-containing metal oxide colloidal particles (A), surfaces of which are coated with a coating including silicon dioxide- and tin oxide-containing composite oxide colloidal particles (B).

9 Claims, No Drawings

(56) References Cited

OTHER PUBLICATIONS

Jun. 19, 2024 Office Action issued in Korean Patent Application No. 10-2021-7018505.

* cited by examiner

REACTIVE SILICONE COMPOSITION AND CURED PRODUCT THEREOF

TECHNICAL FIELD

The present invention relates to a reactive silicone composition capable of producing a cured product having excellent transparency and exhibiting a high refractive index. This reactive silicone composition is useful for applications as optical adhesives or transparent encapsulants, and as optical wiring materials for on-board optical interconnects such as core members in optical signal transmission devices.

BACKGROUND ART

In recent years, communication traffic has been steadily increasing due to development of cloud computing and an increase in the number of smartphone users. As a result, problems have surfaced, including the occurrence of enormous power consumption and the approaching limit of processing volume in data servers where transmitted information data is concentrated. Thus, there is an urgent need for developing technology to improve the above problems.

Under these circumstances, as a technology that can process information at high density and high speed, a technology called an optoelectronic composite substrate (also called an optoelectronic hybrid substrate) has been intensively studied, in which part of electrical wiring in the server board is changed to optical wiring.

On an optoelectronic composite substrate, a light receiving/emitting element that receives/transmits light via an optical waveguide, which is an optical transmission path, is sealed with a transparent optical adhesive in order to improve the reliability of the element. For instance, a light receiving/emitting element such as a surface emitting laser element (VCSEL) is connected to an optical waveguide on a substrate using an optical adhesive, and then soldered by reflow soldering to connect the electrical wiring and the light receiving/emitting element and fix the element.

The optical adhesive and optical waveguide used here are required to be transparent at near-infrared wavelengths such as 850 nm, 1.31 m, and 1.55 m used in optical communication. Further, the refractive index of optical material used for the optical adhesive, the optical waveguide, etc., can be desirably controlled in order to reduce an optical loss at the joint due to the difference in the refractive index between the optical adhesive and the optical waveguide or the light receiving/emitting element.

Further, use of high-strength lead-free solder for the optoelectronic composite substrate has been considered in order to firmly fix the light receiving/emitting element to the substrate. Lead-free solder requires high temperatures for reflow soldering, in which high temperatures as high as 280° C. can be applied to a printed circuit board. Thus, high heat resistance is required for optical wiring-related materials (e.g., optical waveguides, optical adhesives) used for optoelectronic composite substrates.

Examples of the optical adhesive having excellent transparency and heat resistance include a curable resin composition characterized by including an adamantane derivative having a specific structure (Patent Document 1), or a curable resin composition characterized by including a (meth) acrylic acid ester having an alicyclic hydrocarbon group (Patent Document 2).

Further, a vinyl-based silicone compound has been disclosed as a material capable of forming an optical waveguide having transparency and heat resistance in the above near-infrared wavelength region (Patent Document 3).

PRIOR ART DOCUMENTS

Patent Documents

Patent Document 1: Japanese Patent Application Laid-Open Publication No. 2010-132576
Patent Document 2: Japanese Patent Application Laid-Open Publication No. H11-61081
Patent Document 3: Japanese Patent Application Publication No. 2014-510159

SUMMARY OF THE INVENTION

Problems to be Solved by the Invention

While the practical application of optoelectronic composite substrates has been sought in this way, optical materials for optical adhesives, optical waveguides, etc. used for these substrates should have a low propagation loss in the long wavelength region, heat resistance, and an adjustable refractive index. In addition, these materials should also excel in processability such that optical wiring on the above substrate can be formed with high precision by a simple and general-purpose means.

The present invention has been made in view of such circumstances. The purpose of the invention is to provide a reactive silicone composition such that a product thereof is transparent in the near-infrared region used for optical communication, its refractive index is adjustable, a fine structure can be easily formed by conventional semiconductor processing technologies such as lithography and etching, and the product has excellent light resistance and heat resistance after curing.

Means for Solving the Problems

To solve the above problems, the present inventors have conducted intensive research and, as a result, have found that a reactive silicone composition comprising a reactive silicone compound having a specific structure and titanium oxide-containing colloidal particles having a specific structure with a surface modified with an organosilicon compound is used to produce a cured product having excellent transparency, an adjustable refractive index, and excellent light resistance, and the composition has excellent processability allowing for the easy formation of the cured product by light irradiation and/or heating. In this way, the invention has been completed.

Specifically, a first aspect of the invention relates to
a reactive silicone composition comprising component (S) and component (T) below,
the component (S): a reactive silicone compound comprising a condensation product of a diaryl silicate compound represented by Formula [1] and a silicon compound represented by Formula [2],

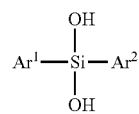

[1]

-continued

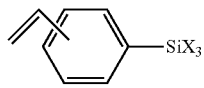

[2]

(wherein $Ar^1$ and $Ar^2$ each independently represent a phenyl group optionally substituted by a $C_{1-6}$ alkyl group and X represents a hydrolyzable reactive group), the component (T): modified titanium oxide-containing oxide colloidal particles produced by bonding an organosilicon compound to surfaces of titanium oxide-containing oxide colloidal particles (C) having an average particle diameter of from 2 nm to 100 nm and comprising, as a core, titanium oxide-containing metal oxide colloidal particles (A) having an average primary particle diameter of from 2 nm to 60 nm, surfaces of which are coated with a coating comprising silicon dioxide- and tin oxide-containing composite oxide colloidal particles (B) having an average primary particle diameter of from 1 nm to 4 nm.

A second aspect relates to the reactive silicone composition according to the first aspect, comprising cyclohexanone or methyl ethyl ketone as a solvent.

A third aspect relates to the reactive silicone composition according to the first or second aspect, further comprising a polymerization initiator.

A fourth aspect relates to a cured product formed from the reactive silicone composition according to any one of the first to third aspects.

A fifth aspect relates to an optical adhesive used for a joint between optical waveguides or a joint between an optical waveguide and a light-receiving element in an optical signal transmission device, the adhesive comprising the reactive silicone composition according to any one of the first to third aspects.

A sixth aspect relates to a core member in an optical signal transmission device, comprising the cured product according to the fourth aspect.

A seventh aspect relates to a film forming agent comprising the reactive silicone composition according to any one of the first to third aspects.

An eighth aspect relates to an optical member comprising, on a surface of an optical base material, a cured film formed from the reactive silicone composition according to any one of the first to third aspects.

A ninth aspect relates to the optical member according to the eighth aspect, wherein an antireflection film is further applied onto a surface of the optical member.

Effects of the Invention

According to the invention, a reactive silicone compound having a specific structure and titanium oxide-containing colloidal particles having a specific structure with a surface modified by an organosilicon compound may be combined so that the resulting reactive silicone composition is used to form a cured product having a high refractive index and excellent light resistance. Also, in the reactive silicone composition, the blending ratio between the reactive silicone compound and the titanium oxide-containing colloidal particles and the composition of the titanium oxide-containing colloidal particles may be adjusted to adjust the refractive index of the resulting cured product.

Further, the reactive silicone composition according to the invention may provide a material having a low propagation loss in the long wavelength region since a cured product thereof has excellent transparency at the near-infrared region.

The reactive silicone composition according to the invention may be easily formed into a cured product by light irradiation and/or heating, and can also be used in the form of a varnish. Furthermore, it is possible to easily form a thin film, and it is also possible to use the composition as a coating composition. Thus, the reactive silicone composition according to the invention can be used to form a cured film (coating layer) having excellent transparency, a high refractive index, and excellent light resistance.

Moreover, the reactive silicone composition according to the invention can provide a composition having excellent storage stability by suppressing aggregation, deposition, and precipitation even after long-term storage, and can also be provided as a highly stable coating material.

The cured product obtained from the reactive silicone composition according to the invention has excellent transparency in the near-infrared region, a high refractive index, and light resistance, and further, the blending ratio between the reactive silicone compound and the colloidal particles and the composition of the colloidal particles may be adjusted to easily adjust the refractive index.

Thus, the cured product in the invention is useful for improving the reliability of optical devices used for, for instance, optoelectronic composite substrates. The cured product is particularly useful as, for instance, optical adhesives used for a joint between optical waveguides and/or a joint between an optical waveguide and a light receiving/emitting element in optical signal transmission devices and/or core members in devices (e.g. cables) for optical signal transmission.

In addition, an optical member may be made by producing, as a film (layer) form, the above cured product on the surface of an optical base material. In this case, the optical member has excellent transparency, a high refractive index, and excellent light resistance. In the case of using a high-refractive member having a refractive index of 1.58 or higher, it is also possible to obtain an optical member having high transparency and good appearance without interference fringes.

Thus, the optical member having a cured film produced using the reactive silicone composition according to the invention is used not only for spectacle lenses, but also for camera lenses, automobile windowpanes, and/or optical filters provided on liquid crystal displays or plasma displays, and the like.

MODES FOR CARRYING OUT THE INVENTION

[Reactive Silicone Composition]

The reactive silicone composition of the invention comprises component (S): a reactive silicone compound and component (T): modified titanium oxide-containing oxide colloidal particles, and the reactive silicone composition may optionally comprise a solvent, a polymerization initiator, and also a reactive diluent as described later.

Hereinafter, each component included, as a component, in the reactive silicone composition of the invention will be described in detail.

<<Component (S)>>

The component (S) in the invention is a reactive silicone compound obtained by subjecting a diaryl silicate compound represented by Formula [1] and a silicon compound represented by Formula [2] to polycondensation in the presence of an acid or a base. That is, the component (S) is a condensation product of a diaryl silicate compound represented by Formula [1] and a silicon compound represented by Formula [2]. Examples include the form of a dealcoholization condensation product.

<Diaryl Silicate Compound Represented by Formula [1]>

Examples of the diaryl silicate compound used in the invention include a compound represented by the following Formula [1] (hereinafter, also simply referred to as a compound of Formula [1]).

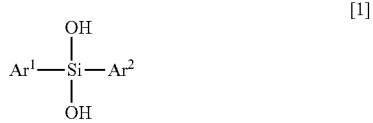

(wherein $Ar^1$ and $Ar^2$ each independently represent a phenyl group optionally substituted by a $C_{1-6}$ alkyl group.) Examples of $Ar^1$ or $Ar^2$ include a phenyl group, a 2-methylphenyl group, a 3-methylphenyl group, a 4-ethylphenyl group, and a 4-isopropylphenyl group.

Specific examples of the compound represented by the above Formula [1] include, but are not limited to, diphenylsilanediol, di(4-methylphenyl)silanediol, di(4-ethylphenyl)silanediol, and di(4-isopropylphenyl)silanediol.

The compound represented by the above Formula [1] may be used singly or as a mixture of two or more kinds.

<Silicon Compound>

Examples of the silicon compound used in the invention include a compound represented by the following Formula [2] (hereinafter, also simply referred to as a compound of Formula [2]).

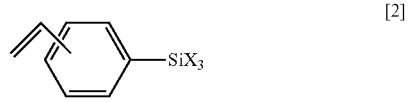

[wherein X represents a hydrolyzable reactive group (a group that can be subject to a hydrolyzable condensation reaction).]

X is preferably a $C_{1-10}$ alkoxy group, a $C_{2-5}$ acyloxy group, a $C_{2-6}$ alkylcarbonyl group, a $C_{2-6}$ alkoxycarbonyl group, or a group $NR^1_2$ (where $R^1$ represents a hydrogen atom or a $C_{1-6}$ alkyl group). More preferably, X represents a $C_{1-6}$ alkoxy group such as a methoxy group or an ethoxy group.

Specific examples of the compound represented by Formula [2] include, but are not limited to, 4-vinylphenyltrimethoxysilane(p-styryltrimethoxysilane) and 4-vinylphenyltriethoxysilane(p-styryltriethoxysilane).

The compound represented by the above Formula [2] may be used singly or as a mixture of two or more kinds.

<Blending Ratio Between Diaryl Silicate Compound and Silicon Compound>

The blending ratio between the diaryl silicate compound [1] and the silicon compound [2] used to prepare the above-mentioned reactive silicone compound is not particularly limited, and to prevent block copolymerization, for instance, the compound of Formula [1] and the compound of Formula [2] may be blended in a molar ratio of 2:1 to 1:2. These compounds are more preferably blended in a molar ratio ranging from 1.1:0.9 to 0.9:1.1, and may be blended in a molar ratio of, for instance, approximately 1:1. To ensure that no free hydroxy group is present in this reactive silicone compound, for instance, the compound of Formula [1] and the compound of Formula [2] are preferably blended in a molar ratio of about 1:1 to 0.9:1.1.

As described above, the diaryl silicate compound represented by the above Formula [1] and the silicon compound represented by the Formula [2] may each be optionally selected, if appropriate, and the compound of Formula [1] and the compound of Formula [2] may each be used singly or as a combination of multiple kinds. If the multiple kinds are used in combination, the total number of moles of the compound of Formula [1] and the total number of moles of the compound of Formula [2] when blended may be within the above numerical ranges.

<Reactive Silicone Compound: Polycondensation Reaction>

A diaryl silicate compound represented by the above formula [1] and a silicon compound represented by the above formula [2] may be subjected to polycondensation in the presence of an acid or a base to produce a reactive silicone compound (condensation product) used in the invention. One of the features involves the structure of the silicon compound represented by the above Formula [2]. The reactive group (polymerizable double bond) contained in the compound of Formula [2] is easily polymerized using radicals, and high heat resistance is exhibited after the polymerization (after curing)

A silicon compound represented by Formula [2] and a diaryl silicate compound represented by Formula [1] may be subjected to co-polycondensation to produce a reactive silicone compound with high heat resistance. In this case, generally the reaction needs to be stopped at the appropriate degree of polymerization such that the product is kept in a liquid state. In the case where the silicon compound represented by Formula [2] used in the invention is in the form of an alkoxysilicon compound, the polycondensation reaction with the diaryl silicate compound is gentle, so that the degree of polymerization can be easily controlled. This characteristic can be said to be an advantage of this form.

A silicon compound represented by Formula [2], preferably an alkoxysilicon compound and a diaryl silicate compound represented by Formula [1] may be subjected to a polycondensation reaction by, for instance, dealcoholization in the absence of a solvent. However, it is possible to use, as a reaction solvent, a solvent (e.g., toluene) inert to the compound represented by Formula [2].

In addition, in the case where the polycondensation reaction is a solvent-free reaction and the compound represented by Formula [2] is an alkoxysilicon compound, there is an advantage that alcohol, which is a reaction by-product, can be easily distilled off.

By contrast, in the case of using a reaction solvent, there is an advantage that the reaction system can be easily made homogeneous and the polycondensation reaction can be performed in a more stable manner.

<Solvent Used for Polycondensation Reaction>

The synthesis (polycondensation) reaction of the reactive silicone compound may be carried out in the absence of a solvent as described above, but a solvent may be used to make the reaction more uniform. The solvent is not particularly limited as long as the solvent reacts with neither the diaryl silicate compound nor the silicon compound and can dissolve the resulting polycondensation product.

Examples of the solvent include ketones (e.g., acetone, methyl ethyl ketone), aromatic hydrocarbons (e.g., benzene, toluene, xylene), glycols (e.g., ethylene glycol, propylene glycol, hexylene glycol), glycol ethers (e.g., ethyl cellosolve, butyl cellosolve, ethyl carbitol, butyl carbitol, diethyl cellosolve, diethyl carbitol), N-methyl-2-pyrrolidone, N,N-dimethylformamide or the like, esters (e.g., ethyl acetate), and alcohols (e.g., methanol, ethanol) in the case below. Alcohols are suitable when X in Formula [2] is a group other than an alkoxy group. In this case, an alcohol may be used to control the polycondensation reaction by reesterification.

In the case of using a solvent for the polycondensation reaction, toluene, xylene, or methyl ethyl ketone may be particularly preferable.

The above-mentioned solvent may be used singly or two or more kinds may be used in combination.

<Other Catalysts, Etc.>

A catalyst may be used for the above polycondensation reaction. The type of catalyst that can be used is not particularly limited as long as the catalyst can be dissolved in the above-mentioned solvent or uniformly dispersed, and may be optionally selected, if appropriate, and used. The catalyst may be used singly or multiple kinds may be used in combination.

Examples of the catalyst that can be used include an acidic compound (e.g., $Ti(OR)_4$, $Zr(OR)_4$, $B(OR)_3$, $Al(OR)_3$), a basic compound (e.g., an alkaline earth metal hydroxide), and a fluoride salt [e.g., $NH_4F$, $NR_4F$ (where R is one or more groups selected from the group consisting of $C_{1-12}$ linear hydrocarbon groups, $C_{3-12}$ branched alkyl groups, and $C_{3-12}$ cyclic alkyl groups)].

Specific examples of the acidic compound include trimethoxyaluminum, triethoxyaluminum, tri-n-propoxyaluminum, triisopropoxyaluminum, tri-n-butoxyaluminum, tri-isobutoxyaluminum, tri-sec-butoxyaluminum, tri-tert-butoxyaluminum, trimethoxyboron, triethoxyborone, tri-n-propoxyboron, triisopropoxyboron, tri-n-butoxyboron, triisobutoxyboron, tri-sec-butoxyboron, tetramethoxytitanium, tetraethoxytitanium, tetra-n-propoxytitanium, tetraisopropoxytitanium, tetra-n-butoxytitanium, tetraisobutoxytitanium, tetra-sec-butoxytitanium, tetra-tert-butoxytitanium, tetramethoxyzirconium, tetraethoxyzirconium, tetra-n-propoxyzirconium, tetraisopropoxyzirconium, tetra-n-butoxyzirconium, tetraisobutoxyzirconium, tetra-sec-butoxyzirconium, and tetra-tert-butoxyzirconium.

Examples of the basic compound include barium hydroxide, sodium hydroxide, potassium hydroxide, strontium hydroxide, calcium hydroxide, magnesium hydroxide, ammonium hydroxide, tetramethylammonium hydroxide, tetrabutylammonium hydroxide, and triethylamine.

Examples of the fluoride salt include ammonium fluoride, tetramethylammonium fluoride, and tetrabutylammonium fluoride.

Of these catalysts, preferably used is one or more compounds selected from the group consisting of tetraisopropoxytitanium (titanium isopropoxide), barium hydroxide, strontium hydroxide, calcium hydroxide, and magnesium hydroxide.

When a catalyst is used, the amount of the catalyst used with respect to the total mass of the diaryl silicate compound represented by Formula [1] and the silicon compound represented by Formula [2] (preferably an alkoxysilicon compound) is 0.01% by mass or more, for instance, from 0.01% to 10% by mass or from 0.1% to 5% by mass from the viewpoint of catalyst action (reaction progression).

<Reaction Conditions for Condensation Reaction>

The reactive silicone compound used in the invention can be obtained through a polycondensation reaction by subjecting a diaryl silicate compound represented by Formula [1] and a silicon compound represented by Formula [2] to, for instance, dealcoholization condensation in the presence of an acidic or basic catalyst. In a preferable embodiment, the polycondensation reaction may be carried out without the addition of water, for instance, with as little water as possible that may be contaminated through the surroundings (reagents, glass walls, the air on the material). Also, the reaction completely free of water (without adding water) may be carried out. As such, the reaction may be carried out in an inert gas (e.g., nitrogen gas) atmosphere, and a reaction vessel may be heated prior to use. In addition, anhydrous reagents may be used to prevent contamination with water.

The reaction temperature may be optionally selected and may be selected, for instance, in the range of 20° C. to 150° C. or in the range of 30° C. to 120° C.

The reaction time is not particularly limited as long as the reaction time is the time required or longer until an increase in the molecular weight of the polycondensation product has been completed and the molecular weight distribution becomes stable, and is, for instance, from several hours to several days.

In the case where the silicon compound represented by Formula [2] is an alkoxysilicon compound, the resulting alcohol as a by-product may be distilled off under reduced pressure during the reaction because this reaction system promotes dealcoholization condensation. However, the alcohol distillation is not essential.

<<Component (T)>>

The component (T) contained in the reactive silicone composition of the invention is modified titanium oxide-containing oxide colloidal particles produced by bonding an organosilicon compound to the surfaces thereof.

More specifically, the component (T) is modified titanium oxide-containing oxide colloidal particles produced by bonding an organosilicon compound to surfaces of titanium oxide-containing oxide colloidal particles (C) having an average particle diameter of from 2 nm to 100 nm. The colloidal particles (C) are colloidal particles including, as a core, titanium oxide-containing metal oxide colloidal particles (A) having an average primary particle diameter of from 2 nm to 60 nm, the surfaces of which are coated with a coating including a silicon dioxide- and tin oxide-containing composite oxide colloidal particles (B) having an average primary particle diameter of from 1 nm to 4 nm.

The average primary particle diameters of the titanium oxide-containing metal oxide colloidal particles (A) as the core and the composite oxide colloidal particles (B) as the coating are measured by a transmission electron microscope. The average particle diameter of the titanium oxide-containing oxide colloidal particles (C) where the surfaces of the core particles (A) are coated with the coating composed of the particles (B) may be measured by a dynamic light scattering method (DLS method).

Note that when the surfaces of the titanium oxide-containing metal oxide colloidal particles (A) are coated with the composite oxide colloidal particles (B), the value for the particle diameter of the resulting titanium oxide-containing oxide colloidal particles (C) may vary due to the interface reaction between the corresponding particles. Because of this, in the case of evaluating the particle diameter of the titanium oxide-containing oxide colloidal particles (C) by the primary particle diameter measured by a transmission electron microscope, this value does not necessarily agree with the sum of the average primary particle diameters of the titanium oxide-containing metal oxide colloidal particle (A) and the composite oxide colloidal particles (B).

Hereinafter, the particle diameter measured by a transmission electron microscope is herein referred to as the "average primary particle diameter", and the particle diameter measured by a dynamic light scattering method (DLS method) is herein referred to as the "average particle diameter (dynamic light scattering particle size)".

<Titanium Oxide-Containing Metal Oxide Colloidal Particles (A)>

The titanium oxide-containing metal oxide colloidal particles (A) are particles having an average primary particle diameter of from 2 nm to 60 nm.

The titanium oxide-containing metal oxide colloidal particles (A) may consist of titanium oxide or may comprise titanium oxide and component(s) other than titanium oxide.

Examples of the component other than titanium oxide include an oxide of at least one metal selected from the group consisting of Fe, Cu, Zn, Y, Zr, Nb, Mo, In, Sn, Sb, Ta, W, Pb, Bi, and Ce. Examples of the form of the above metal oxide include $Fe_2O_3$, CuO, ZnO, $Y_2O_3$, $ZrO_2$, $Nb_2O_5$, $MoO_3$, $In_2O_3$, $SnO_2$, $Sb_2O_5$, $Ta_2O_5$, $WO_3$, PbO, $Bi_2O_3$, and $CeO_2$. These metal oxides can be used singly or multiple kinds may be used in combination.

The colloidal particles (A) may comprise titanium oxide and component(s) (metal oxide(s)) other than titanium oxide. In this case, examples of the combination method include: a method of mixing titanium oxide with one or two or more metal oxides; a method of make a composite of titanium oxide and one or two or more metal oxides; and a method of making a solid solution of titanium oxide and one or two or more metal oxides at the atomic level.

Specific example of the case of containing component(s) (metal oxide(s)) other than titanium oxide in the above colloidal particles (A) include $TiO_2$—$SnO_2$ composite metal oxide colloidal particles in which $TiO_2$ particles and $SnO_2$ particles are chemically bonded at their interface to form a composite; and $TiO_2$—$SnO_2$—$ZrO_2$ composite metal oxide colloidal particles obtained by forming a solid solution of $TiO_2$, $SnO_2$, and $ZrO_2$ at the atomic level.

Further, the colloidal particles (A) may be amorphous or may be crystals of, for instance, anatas type, rutile type, or brookite type. Further, the colloidal particles (A) may be a perovskite-type titanium compound such as barium titanate (represented by $BaTiO_3$ or BaO—$TiO_2$). Among them, the crystal type of the titanium oxide-containing metal oxide colloidal particles is preferably a rutile type.

The titanium oxide content of the titanium oxide-containing metal oxide colloidal particles (A), in terms of $TiO_2$ is from 40% to 100% by mass, preferably 50% by mass or higher, and more preferably 70% by mass or higher. The titanium oxide content, in particular, may be set to 50% by mass or higher. This should increase the refractive index of a cured product (e.g., a cured film, a transparent coating) obtained by using the composition containing these particles. In addition, it is also possible to suppress the occurrence of interference fringes that may occur due to the refractive index of a base material.

Note that the titanium oxide-containing metal oxide colloidal particles (A) may be produced by a known procedure such as an ion exchange process, deflocculation, hydrolysis, or a reaction process. Examples of the above ion exchange process include: a process of treating an acid salt of the above metal (Ti and/or a metal other than Ti) with a hydrogen-type ion exchange resin; or a process of treating a basic salt of the above metal (Ti and/or a metal other than Ti) with a hydroxyl-type anion exchange resin. Examples of the deflocculation include a process of washing a gel obtained by neutralizing an acid salt of the metal with a base or neutralizing a basic salt of the metal with an acid and then deflocculating the gel with an acid or a base. Examples of the hydrolysis include: a process of hydrolyzing an alkoxide of the metal; or a process of hydrolyzing a basic salt of the metal while heating and then removing an unnecessary acid. Examples of the reaction process include a process of reacting the above metal powder with an acid.

<Silicon Dioxide- and Tin Oxide-Containing Composite Oxide Colloidal Particles (B)>

The above silicon dioxide- and tin oxide-containing composite oxide colloidal particles (B) are particles having an average primary particle diameter of from 1 nm to 4 nm.

Examples of the colloidal particles (B) include $SnO_2$—$SiO_2$ composite colloidal particles in which $SnO_2$ particles and $SiO_2$ particles are chemically bonded at their interfaces to make a composite.

In the colloidal particles (B), the mass ratio between silicon dioxide ($SiO_2$) and tin oxide ($SnO_2$) may be, for instance, $SiO_2/SnO_2$=from 0.1 to 5.0.

In addition, the colloidal particles (B) may contain additional component(s) other than silicon dioxide and tin oxide, and examples include one or two or more kinds of atom selected from the group consisting of Al, Zr, Mo, Sb, and W. Examples of the form of the oxide include $Al_2O_3$, $ZrO_2$, $MoO_3$, $Sb_2O_5$, and $WO_3$.

Examples of the colloidal particles (B) in the case of containing additional component(s) other than silicon dioxide and tin oxide include: $SnO_2$—$WO_3$—$SiO_2$ composite colloidal particles in which $SnO_2$ particles, $WO_3$ particles, and $SiO_2$ particles are chemically bonded at their interfaces to form a composite; and $SnO_2$—$MoO_3$—$SiO_2$ composite colloidal particles in which $SnO_2$ particles, $MoO_3$ particles, and $SiO_2$ particles are chemically bonded at their interfaces to form a composite.

The composite oxide colloidal particles (B) may be produced by a known procedure such as an ion exchange process or an oxidation process. Examples of the above ion exchange process include a process of treating an acid salt of atoms constituting the composite oxide: Sn and Si (and, if desired, other atoms) with a hydrogen-type ion exchange resin. Examples of the above oxidation process include a process of reacting powder of the above-mentioned atoms (e.g., Sn and Si) or an oxide thereof with hydrogen peroxide.

<Titanium Oxide-Containing Oxide Colloidal Particles (C)>

The titanium oxide-containing oxide colloidal particles (C) (the composite oxide colloidal particles-coated titanium oxide-containing metal oxide colloidal particles) comprising, as a core, the above titanium oxide-containing metal oxide colloidal particles (A), surfaces of which are coated with a coating comprising the above silicon dioxide- and oxide-containing composite oxide colloidal particles (B), are configured such that the amount (mass ratio) of the coating, the composite oxide colloidal particles (B), with respect to the core, the titanium oxide-containing metal oxide colloidal particles (A), preferably ranges from 0.01 to 1.0.

Note that the value for the average primary particle diameter of the composite oxide colloidal particles (B) is preferably smaller than the value for the average primary particle diameter of the titanium oxide-containing metal oxide colloidal particles (A). It is considered that the composite oxide colloidal particles (B) are coated on surfaces of the titanium oxide-containing metal oxide colloidal particles (A) by electrostatic action in the titanium oxide-containing oxide colloidal particles (C).

A conventionally known procedure may be used to obtain the titanium oxide-containing oxide colloidal particles (C), that is, colloidal particles comprising, as a core, the titanium oxide-containing metal oxide colloidal particles (A), surfaces of which are coated with a coating made of the composite oxide colloidal particles (B).

Examples of the procedure include a process including mixing an aqueous sol containing the titanium oxide-containing metal oxide colloidal particles (A) as a core and an aqueous sol containing the composite oxide colloidal particles (B) as a coating at a mass ratio (B)/(A) of from 0.01 to 1.0 in terms of the mass of the titanium oxide-containing metal oxide and the composite oxide and heating the resulting aqueous medium.

The titanium oxide-containing metal oxide colloidal particles (A) and the composite oxide colloidal particles (B) may be mixed at a temperature of from 0° C. to 100° C. and preferably from room temperature to 60° C. The heating after the mixing is then performed at, for instance, 70° C. to 300° C.

<Intermediate Thin Film Layer>

The titanium oxide-containing oxide colloidal particles (C) may have one or more intermediate thin film layers including any one of a single oxide of at least one atom selected from the group consisting of Si, Al, Sn, Zr, Sb, Nb, Ta, and W, a composite oxide of two or more atoms selected from the above group, or a mixture of the two or more oxides selected from the single oxide and the composite oxide, the intermediate thin film layer being interposed between the core, which is the above titanium oxide-containing metal oxide colloidal particles (A), and the coating, which is the silicon dioxide- and tin oxide-containing composite oxide colloidal particles (B) coating surfaces of the particles (A). The intermediate thin film layer may be a monolayer or a multi-layer containing two or more layers.

The refractive index of the titanium oxide-containing oxide colloidal particles (C) may be adjusted by interposing at least one intermediate thin film layer between the colloidal particles (A) as the core and the colloidal particles (B) as the coating. That is, the refractive index of the modified titanium oxide-containing oxide colloidal particles, which is the component (T) in the invention described later, formed by bonding an organosilicon compound to surfaces of the colloidal particles (C), may be adjusted. Further, use of a reactive silicone composition comprising the below-described modified titanium oxide-containing oxide colloidal particles (component (T)) should improve light resistance and weather resistance of the resulting cured film. In addition, it is possible to improve various physical properties such as tight adhesion between the cured film and a base material. Further, it is possible to suppress coloring of the below-described modified titanium oxide-containing oxide colloidal particles (component (T)) and thus improve transparency of the cured film.

The number of layers and the thickness of the intermediate thin film layer are not particularly limited as long as the amount (mass ratio) of the colloidal particles (B) as the coating with respect to the colloidal particles (A) as the core ranges from 0.01 to 1.0.

If the intermediate thin film layer is provided, the thin film layer is, in particular, suitably composed of at least one of silicon dioxide ($SiO_2$), antimony oxide ($Sb_2O_5$), aluminum oxide ($Al_2O_3$), and zirconium oxide ($ZrO_2$). For instance, the respective component, silicon dioxide, antimony oxide, aluminum oxide, and/or zirconium oxide may be layered to form a thin film layer. Alternatively, a composite such as an antimony oxide-silicon dioxide composite may be made to form a thin film layer.

As an example, inclusion of silicon dioxide as an oxide constituting the intermediate thin film layer can cause an increase in stability of a sol of the titanium oxide-containing oxide colloidal particles (C) [and the below-described modified titanium oxide-containing oxide colloidal particles (component (T))] and can prolong the pot life of the reactive silicone composition described later. This can improve the hardness of a cured product (e.g., a cured film, a transparent coating) obtained from the reactive silicone composition and can improve tight adhesion to a molded product (e.g., an antireflection film) that can be formed on the cured product (e.g., a cured film, a transparent coating). Thus, weather resistance, light resistance, tight adhesion to a base material, (film) hardness, scratch resistance, and flexibility, for instance, are improved. Use of, for instance, silicon dioxide and zirconium oxide and/or aluminum oxide as the intermediate thin film layer makes it possible to produce titanium oxide-containing oxide colloidal particles (C) [and modified titanium oxide-containing oxide colloidal particles (component (T))] that can form a cured product (e.g., a cured film, an transparent coating) having excellent weather resistance, light resistance, tight adhesion to a base material, (film) hardness, scratch resistance, flexibility, etc.

Further, use of zirconium oxide as an oxide constituting the intermediate thin film layer makes it possible to suppress discoloration of the resulting titanium oxide-containing oxide colloidal particles (C) [and the below-described modified titanium oxide-containing oxide colloidal particles (component (T))]. Titanium oxide (titanium oxide sol) having a small primary particle diameter has a problem that a partial reduction reaction from $TiO_2$ to TiO is induced by UV radiation to exhibit a deep blue color as described above. In addition, a stannic oxide ($SnO_2$) sol having an average primary particle diameter of 100 nm or less, especially 30 nm or less has a problem that a partial reduction reaction from $SnO_2$ to SnO is induced by UV radiation to exhibit a brown or blue-green color. At this time, the presence of zirconium oxide in the intermediate thin film layer of the titanium oxide-containing oxide colloidal particles (C) [and the modified titanium oxide-containing oxide colloidal particles (component (T))] can suppress the reduction of titanium oxide and/or stannic oxide, which are components of the oxide colloidal particles, to TiO and/or SnO, thereby suppressing discoloration.

In the case of having the intermediate thin film layer interposed, first, an aqueous solution or dispersion of colloidal particles of atoms included, as components, in the intermediate thin film layer is prepared; and the titanium oxide-containing metal oxide colloidal particles (A) as a core are put thereinto to form an intermediate thin film layer on the surfaces of the colloidal particles (A). When the intermediate thin film layer is formed, it is preferable to heat at preferably 40° C. or higher and 200° C. or lower.

Next, an aqueous sol of the composite oxide colloidal particles (B) as a coating may be added to an aqueous sol of the colloidal particles (A) on which the intermediate thin film layer is formed. Then, the above-described procedure may be used to form the coating. As described above, the amount of the inorganic oxide colloidal particles (B) added with respect to the metal oxide colloidal particles (A) ranges from 0.01 to 1.0 (mass ratio).

<Aqueous Sol of Titanium Oxide-Containing Oxide Colloidal Particles (C)>

The titanium oxide-containing oxide colloidal particles (C) prepared by the above procedure are obtained in the form of an aqueous sol of the titanium oxide-containing oxide colloidal particles (C).

The aqueous sol of the titanium oxide-containing oxide colloidal particles (C) may be optionally washed to remove impurities. In addition, the concentration of all the metal oxides in the aqueous sol may be adjusted by a procedure such as ultrafiltration or evaporation concentration, and the pH and temperature of the aqueous sol may be adjusted, if appropriate. Further, heating to, for instance, 40° C. to 200° C. may be optionally performed.

When the concentration of the aqueous sol is further increased, a conventional procedure such as evaporation or ultrafiltration may be used to concentrate the aqueous gel up to about the maximum 50% by mass. When the pH of this sol is adjusted, an alkali metal, an organic base (amine), an oxycarboxylic acid, or the like, which will be described later, may be added to the sol after concentration.

Note that as used herein, the term "concentration of all the metal oxides" in colloidal particles (C) or modified colloidal particles described later, produced by bonding an organosilicon compound to surfaces of the colloidal particles (C) is defined as the concentration of not only the metal oxides such as $TiO_2$ and $SnO_2$ included in the colloidal particles (A) and (B), but also an inorganic oxide, $SiO_2$ included in the colloidal particles (B).

In addition, an organic solvent-dispersed sol (organosol) may be obtained by replacing an aqueous medium (water), which is a dispersion medium for the aqueous sol, by an organic solvent in the aqueous sol of the titanium oxide-containing oxide colloidal particles (C). This medium can be replaced by a usual procedure such as distillation or ultrafiltration. Examples of this organic solvent include lower alcohols (e.g., methanol, ethanol, isopropyl alcohol), cellosolves (e.g., methyl cellosolve, ethyl cellosolve), glycols (e.g., ethylene glycol), ethers (e.g., propylene glycol monomethyl ether, propylene glycol monoethyl ether, diethyl ether, tetrahydrofuran), esters (e.g., methyl acetate, ethyl acetate), ketones (e.g., acetone, methyl ethyl ketone, cyclohexanone), halogenated hydrocarbons (e.g., dichloroethane), aromatic hydrocarbons (e.g., toluene, xylene), linear amides (e.g., N,N-dimethylformamide, N, N-dimethylacetamide), and cyclic amides (e.g., N-methyl-2-pyrrolidone). These organic solvents may be used singly or two or more kinds may be mixed and used.

The sol of the titanium oxide-containing oxide colloidal particles (C) may contain any other component as long as the purpose of the invention is achieved. For instance, when an oxycarboxylic acid is included in a proportion of about 30% by mass or less with respect to the total amount of all the metal oxides, a colloid having further improved performance such as dispersibility can be obtained. Examples of the oxycarboxylic acid used include lactic acid, tartaric acid, citric acid, gluconic acid, malic acid, and glycolic acid.

In addition, the sol of the titanium oxide-containing oxide colloidal particles (C) may contain an alkali component. Examples include a hydroxide of alkali metal such as Li, Na, K, Rb, or Cs; and an organic base such as alkyl amine (e.g., ammonia, ethylamine, triethylamine, isopropylamine, n-propylamine, tripentylamine), aralkylamine (e.g., benzylamine), alicyclic amine (e.g., piperidine), and alkanolamine (e.g., monoethanolamine, triethanolamine). One kind thereof may be included singly, or two or more kinds may be mixed and included. These alkaline components can be included in a proportion of about 30% by mass or less with respect to the total amount of all the metal oxides. In addition, the above oxycarboxylic acid may be used in combination.

<Modified Titanium Oxide-Containing Oxide Colloidal Particles Produced by Bonding Organosilicon Compound to at Least Part of Surfaces Thereof>

The component (T) used in the invention: modified titanium oxide-containing oxide colloidal particles are obtained by bonding an organosilicon compound to at least part of the surfaces of the titanium oxide-containing oxide colloidal particles (C). The surface modification treatment with the organosilicon compound makes the colloidal surface hydrophobic, and their dispersion into a water-insoluble organic solvent can be improved.

The particles are structured such that an organosilicon compound (e.g., a hydrolyzable reactive group in each compound represented by general formulae (1) to (4) described below) is bonded to, for instance, a hydroxy group derived from the coating composite oxide colloidal particles (B) in the titanium oxide-containing oxide colloidal particles (C).

It is possible to use, as the organosilicon compound used, an organosilicon compound or silane compound publicly known as a silane coupling agent. The kind may be selected, if appropriate, depending on, for instance, the usage and/or the type of solvent.

Specific examples of the above silane coupling agent include vinyl trichlorosilane, vinyl trimethoxysilane, vinyl triethoxysilane, 2-(3,4-epoxycyclohexyl)ethyltrimethoxysilane, 3-glycidoxypropyltrimethoxysilane, 3-glycidoxypropylmethylditriethoxysilane, 3-glycidoxypropyltriethoxysilane, p-vinylphenyltrimethoxysilane, 3-methacryloyloxypropylmethyldimethoxysilane, 3-methacryloyloxypropyltrimethoxysilane, 3-methacryloyloxypropylmethyldiethoxysilane, 3-methacryloyloxypropyltriethoxysilane, 3-acryloyloxypropyltrimethoxysilane, N-2-(aminoethyl)-3-aminopropylmethyldimethoxysilane, N-2-(aminoethyl)-3-aminopropylmethyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, 3-[methoxy-poly(ethyleneoxy)propyl] trimethoxysilane, bis(triethoxysilylpropyl)tetrasulfide, and 3-isocyanatopropyltriethoxysilane.

Additionally, specific examples of the silane include methyltrichlorosilane, dimethyldichlorosilane, trimethylchlorosilane, phenyltrichlorosilane, methyltrimethoxysilane, dimethyldimethoxysilane, phenyltrimethoxysilane, methyltriethoxysilane, methyltriethoxysilane, dimethyldiethoxysilane, phenyltriethoxysilane, n-propyltrimethoxysilane, n-propyltriethoxysilane, hexyltrimethoxysilane, hexyltriethoxysilane, decyltrimethoxysilane, trifluoropropyltrimethoxysilane, and hexamethyldisilazane.

Further, for instance, the organosilicon compound used may be each compound represented by the following general formulae (1) to (4).

General formula (1): Monofunctional silane represented by $R^2{}_3SiX^2$.

General formula (2): Bifunctional silane represented by $R^2{}_2SiX^2{}_2$.

General formula (3): Trifunctional silane represented by $R^2SiX^2{}_3$.

General formula (4): Tetrafunctional silane represented by $SiX^2{}_4$.

In the above formulae (1) to (4), $R^2$ represents an organic group having a $C_{1-8}$ alkyl group, a phenyl group, a vinyl group, a methacryloxy group, a mercapto group, an amino group, or an epoxy group.

$X^2$ represents a hydrolyzable reactive group, and examples preferably include groups listed as the group X in the compound represented by the above formula [2].

The organosilicon compound to be bonded to surfaces of the titanium oxide-containing oxide colloidal particles (C) may be used singly or two or more kinds may be used in combination.

In addition, the surfaces of the titanium oxide-containing oxide colloidal particles (C) may be subjected to surface modification treatment for bonding an organosilicon compound. At this time, the organosilicon compound may be partially hydrolyzed. Alternatively, the surface modification treatment may be performed without hydrolysis.

Further, after the surface modification treatment, it is preferable that the hydrolyzable reactive groups of the organosilicon compound have reacted with the hydroxy groups on the surfaces of the titanium oxide-containing oxide colloidal particles (C). However, there is no problem even if some hydroxy groups remain untreated.

To bond the organosilicon compound to surfaces of the titanium oxide-containing oxide colloidal particles (C), a predetermined amount of the above colloidal particles (C) (e.g., a sol of the colloidal particles (C)) are mixed with, for instance, an alcohol solution of the organosilicon compound. After adding a predetermined amount of water (if necessary) and optionally, a hydrolysis catalyst such as dilute hydrochloric acid, the mixture may be left at room temperature for a predetermined time or heated.

Alternatively, a hydrolyzate of the organosilicon compound and the colloidal particles (C) may be added to a mixed solution of water and alcohol, and the mixture may be heated.

The amount of the organosilicon compound bonded to surfaces of the titanium oxide-containing oxide colloidal particles (C) (the amount of the organosilicon compound added) is not particularly limited. For instance, the amount with respect to the total mass of all the metal oxides in the colloidal particles (C) is from 0.1% to 40% by mass, for example, from 3% to 30% by mass and preferably from 5% to 20% by mass.

The modified titanium oxide-containing oxide colloidal particles formed by bonding the resulting organosilicon compound to the surfaces can be obtained in the form of an organic solvent-dispersed sol (organosol). The organic solvent, which is a dispersion medium, may be replaced with a desired organic solvent by a solvent replacement procedure such as the above-mentioned distillation or ultrafiltration.

In the invention, it is possible to use a sol in which the total concentration of the metal oxides (the concentration of all the metal oxides including $SiO_2$ for convenience) in an organic solvent-dispersed sol (organosol) (also referred to as a modified titanium oxide colloidal particle dispersion) of the modified titanium oxide-containing oxide colloidal particles formed by bonding the organosilicon compound to the surfaces thereof is, for instance, from 0.01% to 60% by mass. Here, a 10 to 40 mass % sol, for instance, may be preferable. For instance, use of a sol having a total metal oxide concentration of 0.01% by mass or higher can make it easy to obtain a desired shape (e.g., the thickness) at the time of producing a cured product from a composition obtained by blending with other components. In addition, use of a sol with 60% by mass or less should give the sol satisfactory stability.

<<Reactive Silicone Composition>>

The reactive silicone composition of the invention comprises the above component (S): a reactive silicone compound and component (T): modified titanium oxide-containing oxide colloidal particles.

The ratio between the component (S) and the component (T) is not particularly limited, and, for instance, 10 to 500 parts by mass such as 25 to 400 parts by mass of the component (T): modified titanium oxide-containing oxide colloidal particles may be included with respect to 100 parts by mass of the component (S): a reactive silicone compound. In the case of including a reactive diluent described later, 10 to 500 parts by mass of the component (T) may be included with respect to 100 parts by mass of the total of the component (S) and the reactive diluent.

<Reactive Diluent>

The component (S): the reactive silicone compound contained in the reactive silicone composition of the invention may have poor processability due to a high viscosity. Thus, a reactive diluent may be added to adjust the viscosity appropriately. In this case, the reactive diluent should have a characteristic that does not significantly reduce the heat resistance.

Examples of such a reactive diluent include a compound having at least one polymerizable group selected from the group consisting of alkenyl groups and (meth)acrylic groups.

Examples of the compound having a polymerizable group include one or more compounds selected from the group consisting of compounds represented by the following Formula [3] and compounds represented by the following Formula [4]. They may each be used singly or two or more kinds may be used in combination.

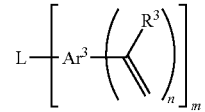

[wherein $R^3$ represents a hydrogen atom or a methyl group;

L is a $C_{1-20}$ m-valent aliphatic hydrocarbon residue optionally substituted with a single bond, a hydrogen atom, an oxygen atom, or a phenyl group, a $C_{1-20}$ m-valent aliphatic hydrocarbon residue optionally containing an ether bond, or a $C_{1-20}$ multivalent alcohol residue optionally containing an ether bond;

$Ar^3$ represents a (n+1)-valent aromatic hydrocarbon residue, monocyclic hydrocarbon residue, or bicyclic hydrocarbon residue or tricyclic hydrocarbon residue;

m represents an integer of 1 to 3 (provided that m represents 1 when L represents a hydrogen atom and m represents 2 when L represents a single bond or an oxygen atom); and n each independently represents 1 or 2.]

Examples of L include a methyl group, ethyl group, n-propyl group, isopropyl group, n-butyl group, n-hexyl group, cyclohexyl group, benzyl group, phenethyl group, methoxymethyl group, ethoxymethyl group, 2-methoxyethyl group, methylene group, ethylene group, trimethylene group, 1-methylethylene group, propane-2,2,-diyl group, tetramethylene group, pentamethylene group, 2,2-dimethyltrimethylene group, hexamethylene group, 3-methylpentamethylene group, cyclohexane-1,4-diyl group, diethylene glycol residue (—CH$_2$CH$_2$OCH$_2$CH$_2$—), triethylene glycol residue (—(CH$_2$CH$_2$O)$_2$CH$_2$CH$_2$—), dipropylene glycol residue (—CH(CH$_3$)CH$_2$OCH(CH$_3$)CH$_2$—), trimethylene glycol residue (—CH$_2$CH$_2$CH$_2$—), di(trimethylene glycol) residue (—CH$_2$CH$_2$CH$_2$OCH$_2$CH$_2$CH$_2$—), propane-1,1,1-triyl group (—C(—)$_2$CH$_2$CH$_3$), propane-1,1,3-triyl group (—CH(—)CH$_2$CH$_2$—), and butane-1,2,4-triyl group (—CH$_2$CH(—)CH$_2$CH$_2$—).

Examples of Ar$^3$ include a group (e.g., a phenyl residue, naphthyl residue, anthracyl residue) obtained by removing (n+1) hydrogen atoms from an aromatic hydrocarbon ring such as benzene, naphthalene, or anthracene. Ar$^3$ is preferably unsubstituted or substituted with a C$_{1-6}$ alkyl group. It is more preferable that Ar$^3$ represents, in particular, a phenyl residue.

Also, independently of that, it is preferable that R$^3$ represents a hydrogen atom.

In another independent preferable embodiment, n in Formula [3] is 2. It is more preferable that Ar$^3$ represents a phenyl residue and R$^3$ represents a hydrogen atom. It is still more preferable that Ar$^3$ represents a phenyl residue, R$^3$ represents a hydrogen atom, and n is 2.

Further, in all of the above-described embodiments of Formula [3], it is the most preferable that L represents a hydrogen atom and m is 1.

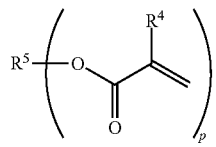

[4]

(wherein R$^4$ represents a hydrogen atom or a methyl group;

R$^5$ represents a p-valent C$_{1-20}$ aliphatic hydrocarbon residue optionally substituted with a phenyl group, or a p-valent C$_{1-20}$ aliphatic hydrocarbon residue optionally containing an ether bond; and p represents an integer of 1 to 6.)

Examples of R$^5$ in Formula [4] include a methyl group, ethyl group, n-propyl group, isopropyl group, n-butyl group, n-hexyl group, cyclohexyl group, benzyl group, phenethyl group, methoxymethyl group, ethoxymethyl group, 2-methoxyethyl group, methylene group, ethylene group, trimethylene group, 1-methylethylene group, propane-2,2,-diyl group, tetramethylene group, pentamethylene group, 2,2-dimethyltrimethylene group, hexamethylene group, 3-methylpentamethylene group, cyclohexane-1,4-diyl group, diethylene glycol residue (—CH$_2$CH$_2$OCH$_2$CH$_2$—), triethylene glycol residue (—(CH$_2$CH$_2$O)$_2$CH$_2$CH$_2$—), dipropylene glycol residue (—CH(CH$_3$)CH$_2$OCH(CH$_3$) CH$_2$—), trimethylene glycol residue (—CH$_2$CH$_2$CH$_2$—), di(trimethylene glycol) residue (—CH$_2$CH$_2$CH$_2$OCH$_2$CH$_2$CH$_2$—), propane-1,1,1-triyl group (—C(—)$_2$CH$_2$CH$_3$), propane-1,1,3-triyl group (—CH(—)CH$_2$CH$_2$—), and butane-1,2,4-triyl group (—CH$_2$CH(—)CH$_2$CH$_2$—).

In the above Formula [4], it is more preferable that R$^5$ represents a C$_{2-10}$ polyhydric alcohol residue optionally containing an ether bond and p represents an integer of 2 to 6.

Note that to produce a cured product having desirable transparency at near infrared wavelengths of 850 nm, 1.31 m, and 1.55 m, attention should be paid to preferably use, as a reactive diluent, one or more compounds represented by Formula [3].

Specific examples of the compound represented by Formula [3] or [4] will be described below, but the compound is not limited to them.

Specific examples of the compound represented by Formula [3] include divinylbenzene, styrene, diisopropenylbenzene, 4,4'-divinylbiphenyl, 2-(4-vinylphenoxy) styrene, 4-phenethylstyrene, and 1,1,1-tris(4-vinylphenoxy)propane.

Specific examples of the compound represented by Formula [4] include benzyl(meth)acrylate, neopentyl glycol di(meth)acrylate, 1,6-hexanediol di(meth)acrylate, 1,9-nonanediol di(meth)acrylate, trimethylolpropane tri(meth) acrylate, pentaerythritol tetra(meth)acrylate, dipentaerythritol hexa(meth)acrylate, ditrimethylolpropane tetra(meth) acrylate, ethyleneglycol di(meth)acrylate, diethyleneglycol di(meth)acrylate, triethyleneglycol di(meth)acrylate, tetraethyleneglycol di(meth)acrylate, propyleneglycol di(meth) acrylate, dipropyleneglycol di(meth)acrylate, tripropyleneglycol di(meth)acrylate, ethoxylated bisphenol A di(meth)acrylate, ethoxylated trimethylolpropane tri(meth) acrylate, propoxylated trimethylolpropane tri(meth)acrylate, ethoxylated pentaerythritol tetra(meth)acrylate, propoxylated pentaerythritol tetra(meth)acrylate, ethyleneglycol diglycidylether (meth)acrylic acid adduct, and propyleneglycol diglycidylether (meth)acrylic acid adduct. Note that as used herein, the term such as (meth)acrylate or (meth)acrylic acid represents both methacrylate and acrylate, and methacrylic acid and acrylic acid.

A reactive diluent may be used in the reactive silicone composition of the invention. In this case, a compound having at least one polymerizable group selected from the group consisting of alkenyl groups and (meth)acrylic groups as a reactive diluent may be used at the ratio of 1 to 100 parts by mass and preferably 5 to 70 parts by mass with respect to 100 parts by mass of the reactive silicone compound.

For instance, when used as the reactive diluent, a compound represented by Formula [3] may be used at the ratio of 1 to 100 parts by mass, preferably 5 to 70 parts by mass, for example, 5 to 20 parts by mass with respect to 100 parts by mass of the reactive silicone compound.

In addition, when used as the reactive diluent, a compound represented by Formula [4] may be used at the ratio of 1 to 100 parts by mass and preferably 5 to 50 parts by mass with respect to 100 parts by mass of the reactive silicone compound.

Note that ratios other than the above-mentioned ratios are likewise possible.

The reactive silicone composition of the invention may contain a solvent so as to, for instance, impart fluidity, adjust the solid content concentration, and/or adjust the surface tension, viscosity, and evaporation rate.

The solvent used is not limited as long as the solvent can dissolve or disperse each component included in the reactive silicone composition, and is, for instance, water or an organic solvent.

Examples of the above organic solvent include alcohols (e.g., methanol, ethanol, isopropyl alcohol, butanol), cellosolves (e.g., methyl cellosolve, ethyl cellosolve), glycols (e.g., ethylene glycol), esters (e.g., methyl acetate, ethyl acetate, butyl acetate), ethers (e.g., diethyl ether, propylene glycol monomethyl ether, propylene glycol monoethyl ether, tetrahydrofuran), ketones (e.g., acetone, methyl ethyl ketone, cyclohexanone), halogenated hydrocarbons (e.g., dichloroethane), aromatic hydrocarbons (e.g., toluene, xylene), N,N-dimethylformamide, and N-methyl-2-pyrrolidone. Among them, cyclohexanone or methyl ethyl ketone is included as a suitable solvent.

The concentration of the total solid content in the reactive silicone composition of the invention may be selected, if appropriate, so as to control the thickness and coatability, and may be, for instance, from 1% to 99% by mass, from 10% to 80% by mass, from 20% to 40% by mass, or from 30% to 70% by mass. Note that as used herein, the term "total solid content" refers to all components of the reactive silicone composition excluding the solvent, and even liquid components are treated as "solid content" for convenience.

Further, from the viewpoint of processability with an application device such as a coater, the reactive silicone composition may have a viscosity of from 0.1 to 200 mPa·s or from 0.5 to 50 mPa·s.

Further, the reactive silicone composition of the invention may be used to form, on a base material, a cured product (cured film) from the composition as described later. At this time, to improve wettability on the base material and smoothness of the cured film, various surfactants and/or leveling agents, for instance, may be included. Further, a UV absorber, an antioxidant, a photo-stabilizer, and/or an antistatic agent, for instance, may be added as long as they do not affect the physical properties of the cured film. Furthermore, it is possible to add, for instance, a disperse dye, an oil-soluble dye, a fluorescent dye, a pigment, a photochromic compound, and/or a thixotropy agent.

In addition, to adjust the refractive index with respect to a substrate (e.g., a base material such as a lens), various metal oxide fine particles may be included in the reactive silicone composition of the invention. Examples of the metal oxide fine particles include fine particles of aluminum oxide, titanium oxide, antimony pentoxide, zirconium oxide, silicon dioxide, and cerium oxide having an average primary particle diameter of from 2 nm to 60 nm.

[Cured Product]

The reactive silicone composition of the invention may be used to obtain a cured product by reacting a polymerizable double bond, which is included in the reactive silicone compound, by light (active energy ray) radiation or heating in the absence of any polymerization initiator or in the presence of a photoradical polymerization initiator or a thermal radical polymerization initiator. An embodiment where the reactive silicone composition contains a polymerization initiator is also subject to the invention.

The resulting cured product (molded product) is useful as an optical device material. For instance, it is possible to be used as a material for optical interconnection, specifically, as a core member for an optical signal transmission cable.

In addition, because the cured product has a useful characteristic as an optical device material, the reactive silicone composition itself may be used as an optical adhesive, which can be used at a joint between optical waveguides or at a joint between an optical waveguide and a light-receiving element in an optical signal transmission device.

Examples of the photoradical polymerization initiator include acetophenones, benzophenones, Michler's benzoylbenzoate, amyloxime ester, tetramethylthiuram monosulfide, and thioxanthones.

In the case of using a photoradical polymerization initiator, preferable examples include a photocleavable photoradical polymerization initiator. Examples of the photocleavable photoradical polymerization initiator include those described in the "Latest UV Curing Technology" (page 159, publisher: Kazuhiro Takausu, Technical Information Institute Co., Ltd., 1991).

Examples of a commercially available photoradical polymerization initiator include: trade name: OMNIRAD (registered trademark, former name Irgacure) 184, 369, 651, 500, 819, 907, 784, 2959, CGI1700, CGI1750, CGI1850, and CG24-61, OMNIRAD (registered trademark, former name Darocur) 1116 and 1173, OMNIRAD (registered trademark, former name Lucirin) TPO, which are manufactured by IGM Resins B.V.; trade name: Ebecryl P36, which is manufactured by UCB S. A.; and trade name: Esacure KIP150, KIP65LT, KIP100F, KT37, KT55, KT046, or KIP75/B, which are manufactured by Fratelli Lamberti, S.p.A.

Examples of the thermal radical polymerization initiator include the following initiators.

1) Peroxides:

for example, t-butyl (3,5,5-trimethylhexanoyl)peroxide, t-butyl hydroperoxide, cumene hydroperoxide, t-butyl peroxyacetate, t-butyl peroxybenzoate, t-butyl peroxyoctanoate, t-butyl peroxyneodecanate, t-butyl peroxyisobutyrate, lauroyl peroxide, t-amyl peroxypivalate, t-butyl peroxypivalate, dicumyl peroxide, benzoyl peroxide, potassium persulfate, or ammonium persulfate;

2) Azo Compounds:

for example, 2,2'-azobis(2-methylpropionate)dimethyl, 2,2'-azobis(isobutyronitrile), 2,2'-azobis(2-butanenitrile), 4,4'-azobis(4-pentanoate), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2,2'-azobis(N,N-dimethyleneisobutylamidine)dichloride, 2,2'-azobis(2-amidinopropane)dichloride, 2,2'-azobis(N,N-dimethylene isobutylamide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide), or 2,2'-azobis(isobutylamide)dihydrate;

3) Redox systems including the following combinations:
- a mixture of hydrogen peroxide or alkyl peroxide, a peracid ester, or a percarbonate compound with an iron salt or a primary titanium salt, zinc formaldehyde sulfoxylate or sodium formaldehyde sulfoxylate, or reducing sugar;
- a combination of an alkali metal or ammonium salt of persulfuric acid, perboric acid, or perchloric acid with an alkali metal bisulfite like sodium metabisulfite or reducing sugar; or
- a combination of an alkali metal persulfate with an aryl phosphonic acid such as benzenephosphonic acid, another similar acid, or reducing sugar.

In the case of using a polymerization initiator, the amount of the photoradical polymerization initiator or thermal radical polymerization initiator used is based on 100 parts by mass of the reactive silicone compound of the component (S) or based on, when a reactive diluent is included, 100 parts by mass of the total of the component (S) and the reactive diluent, and is in the range of, for instance, from 0.1 to 15 parts by mass or in the range of 0.5 to 10 parts by mass. Each of the above-mentioned polymerization initiators may be used singly, or a plurality of kinds of the initiators may be used in combination.

Examples of the active energy ray used for the reaction (curing) with the reactive silicone composition include infrared radiation, UV radiation, and electron beams.

In addition, the heating temperature is, for instance, from 70° C. to 200° C. or from 90° C. to 150° C.

Prior to the light irradiation and/or heating, preheating may be performed in order to remove a solvent contained in the reactive silicone composition.

Further, the reactive silicone composition of the invention may be applied onto the surface of a base material to produce a cured film by light irradiation or heating. That is, the reactive silicone composition can be used as a coating composition. A film forming agent including the above reactive silicone composition is also subject to the invention. Further, by using a transparent base material (optical base material) suitable for optical applications, an optical member having a cured film (transparent coating) can be obtained.

The base material used involves various base materials made of, for instance, glass or plastic. Examples include a film sheet, a silicon wafer substrate, a silicon/silicon dioxide-coated substrate, a silicon nitride substrate, a glass substrate, an ITO substrate, a polyimide substrate, and a low dielectric constant material (low-k material)-coated substrate.

Specific examples of the applicable base material include a spectacle lens, various optical lenses such as camera lens, various display element filters, a looking glass, a windowpane, a coating film such as for automobiles, and a light cover used for automobiles. The cured film formed on the surface of the base material may be applicable to a hard coat film, a primer film for a plastic lens, or the like.

Examples of an applicable method for applying the reactive silicone composition onto the surface of the base material include a commonly used method such as dipping, spin coating, or spray coating. For example, the dipping or spin coating may be selected from the viewpoint of, for instance, the degree of area.

In addition, curing after coating may be implemented by hot air drying or irradiation with active energy rays. The curing conditions for hot air drying involve hot air at preferably from 70° C. to 200° C. and particularly preferably from 90° C. to 150° C. Meanwhile, examples of the active energy rays include infrared radiation, UV radiation, and electron beams. In particular, far infrared radiation can suppress heat damage to a low level.

Further, before coating the reactive silicone composition onto the surface of the base material, the surface of the base material may be chemically treated with an acid, an alkali or various organic solvents or detergents, or may be physically treated with plasma, UV radiation, or the like. This can improve tight adhesion between the cured film and the base material. Further, the surface of the base material may be subjected to primer treatment using various resins to further improve adhesion between the base material and the cured film.

In addition, the cured film formed from the reactive silicone composition of the invention may be used for a reflective film as a high refractive index film. Further, the cured film can be used as a multifunctional film by adding, for instance, anti-fog, photochromic, and/or anti-fouling functionality.

An optical member having a cured film formed from the reactive silicone composition of the invention is applicable to not only for spectacle lenses, but also for camera lenses, automobile windowpanes, optical filters attached to liquid crystal displays, plasma displays, or the like.

Furthermore, the optical member has, on the surface of the optical base material, a cured film formed from the reactive silicone composition of the invention. Here, an antireflection film, which includes an inorganic oxide-deposited film, may be formed on the cured film. Examples of the antireflection film that can be used include, but are not particularly limited to, a conventionally known vapor deposited film including an inorganic oxide single-layer or multi-layer. Examples of the antireflection film include the antireflection film disclosed in Japanese Patent Application Laid-Open Publication No. H02-262104 and Japanese Patent Application Laid-Open Publication No. S56-116003.

EXAMPLES

Hereinafter, the invention will be described in more detail based on Production Examples, Examples, and Comparative Examples. However, the invention is not limited to these Examples.

The physical properties of each dispersion were determined by the following measuring protocols.

Viscosity: determined using a BL-type viscometer (20° C.).

Solid content concentration: determined from residual solids after baking at 600° C.

Average particle diameter measured by dynamic light scattering (dynamic light scattering particle size):

A sol was diluted with a dispersion solvent and measured with a dynamic light scattering meter: Zetasizer manufactured by Malvern Instruments, Ltd., while parameters of the solvent were used.

Average primary particle diameter measured by a transmission electron microscope:

A sol was dropped on a copper mesh, dried, and observed with a transmission electron microscope (JEM-1020 manufactured by JEOL Ltd.) at an acceleration voltage of 100 kV; and 100 particles were measured and averaged to determine the average primary particle diameter.

Here, the following procedures were used to measure and evaluate various physical properties of the reactive silicone compositions prepared and used in Examples 1 to 13, the Comparative Example compositions prepared and used in Comparative Examples 1 and 2, and the cured film obtained from each composition.

(1) Evaluation of Storage Stability

Each composition was stored in a dryer set at 5° C. for 1 day, the appearance before and after the storage was visually checked, and the presence or absence of change was evaluated according to the following criteria. Table 1 [Table 1-1 and Table 1-2] shows the evaluation results obtained.

A: Having fluidity without occurrence of precipitation.

N: Gelled with precipitates.

(2) Infrared Transmittance

A UV-visible near-infrared spectrophotometer (UV-3600, manufactured by Shimadzu Corporation) was used to measure, at a measurement wavelength of 800 nm to 1600 nm, the average transmittance of each cured film formed on a glass substrate.

(3) Haze Value

The haze value of each cured film formed on a glass substrate was measured with a haze meter (NDH5000, manufactured by NIPPON DENSHOKU INDUSTRIES Co., Ltd.).

(4) Film Thickness and Refractive Index

The reflectance of each cured film formed on a glass substrate was measured with a lens reflectance measuring device (USPM-RU, manufactured by Olympus Corporation). In addition, the film thickness was calculated from the measured reflectance using an optical simulation.

(5) Light Resistance Test

The transmittance of each cured film formed on a glass substrate was measured with a spectrophotometer (UV- 3600, manufactured by Shimadzu Corporation), and the YI value was calculated based on JIS 7373.

Then, a QUV accelerated weathering tester (at a UVA lamp irradiation intensity of 890 mW/m$^2$) was used to calculate the YI value of the cured film exposed for 96 h.

The YI values obtained were used to calculate ΔYI of the cured film between before and after UV irradiation. The criteria are as follows.

A: ΔYI is less than 2.0.
N: ΔYI is 2.0 or more.

Production Example 1

<Preparation of Reactive Silicone Compound>

The procedure disclosed in WO 2012/097836 was used to synthesize a colorless, transparent reactive silicone compound. Specifically, diphenylsilanediol and styryltrimethoxysilane were subjected to dealcoholization condensation in a toluene solvent while heating at 50° C. and using barium hydroxide monohydrate as a catalyst. The mixture was then cooled and filtered, and toluene and a by-product methanol were removed in vacuo using a rotary evaporator while heating at 50° C. to synthesize a colorless, transparent reactive silicone compound of interest.

The procedure disclosed in WO 2012/097836 was used to prepare a reactive silicone compound-containing mixed solution containing a reactive diluent. Specifically, divinylbenzene purified by vacuum distillation was added, as a reactive diluent, to the reactive silicone compound obtained above at a predetermined ratio (7 parts by mass with respect to 100 parts by mass of the reactive silicone compound). The mixture was stirred and blended while heating at 40° C. to give a homogenous liquid, which was then cooled to room temperature to yield a pale yellow, transparent mixed solution. To this mixed solution was added, as a photopolymerization initiator, OMNIRAD (registered trademark, formerly known as Lucirin) TPO (2,4,6-trimethylbenzoyldiphenylphosphine oxide), manufactured by IGM Resins B.V., at a predetermined ratio (3 parts by mass with respect to the total of 100 parts by mass of the reactive silicone compound and the reactive diluent). The mixture was dissolved while stirring to prepare a reactive silicone compound-containing mixed solution of interest.

Production Example 2

<Synthesizing Modified Titanium Oxide Colloidal Particle Dispersion 1>

First, 126.2 g of pure water was put in a 1-L container, and 17.8 g of metastannic acid (the content was 15 g in terms of $SnO_2$), 284 g of titanium tetraisopropoxide (the content was 80 g in terms of $TiO_2$), 84 g of oxalic acid dihydrate (70 g in terms of oxalic acid), and 438 g of 35 mass % tetraethylammonium hydroxide aqueous solution were added thereto while stirring. The resulting mixed solution had a molar ratio of oxalic acid/titanium atom of 0.78 and a molar ratio of tetraethylammonium hydroxide/titanium atom of 1.04. Next, 950 g of the mixed solution was kept at 80° C. for 2 h. Further, the pressure was reduced to 580 Torr and kept for 2 h to prepare a titanium mixed solution. The pH of the prepared titanium mixed solution was 4.7, the conductivity was 27.2 mS/cm, and the $TiO_2$ concentration was 8.4% by mass.

Then, 950 g of the above titanium mixed solution and 950 g of pure water were put into a 3 L glass-lined autoclave container, and were subjected to hydrothermal treatment at 140° C. for 5 h. After cooled to room temperature, the solution recovered after the hydrothermal treatment was a pale milky white aqueous dispersion of titanium oxide colloidal particles. The resulting dispersion had a pH of 3.9, a conductivity of 19.7 mS/cm, a $TiO_2$ concentration of 4.2% by mass, 4.0% by mass of tetraethylammonium hydroxide, and 1.8% by mass of oxalic acid. The dynamic light scattering particle size was 16 nm, and a transmission electron microscope was used to observe elliptical particles with an average primary particle diameter of from 5 nm to 15 nm. The resulting dispersion was dried at 110° C. to give powder, which was subjected to X-ray diffractometry and was found to be a rutile-type crystal. The titanium oxide colloidal particles obtained were designated as titanium oxide-containing metal oxide colloidal particles (A) (the concentration of titanium oxide in the colloidal particles was 84% by mass) (hereinafter, also referred to as titanium oxide-containing core particles (A)).

Next, 27.9 g of sodium silicate aqueous solution (JIS No. 3 sodium silicate, containing 34% by mass of $SiO_2$, manufactured by Fuji Chemical Co., Ltd.) was diluted with 27.9 g of pure water, and 8.6 g of sodium stannate trihydrate (containing 55% by mass of $SnO_2$, manufactured by Showa Kako Corp.) was added and dissolved while stirring to obtain a sodium silicate-stannate aqueous solution. Then, 64.4 g of the resulting sodium silicate-stannate aqueous solution was diluted with 411 g of pure water. The mixture was made to pass through a column packed with a hydrogen-type cation exchange resin (Amberlite (registered trademark) IR-120B) to produce 570 g of aqueous dispersion of silicon dioxide-stannate composite oxide colloidal particles (at pH 2.7, containing 0.83% by mass of $SnO_2$ and 1.67% by mass of $SiO_2$, and having a mass ratio $SiO_2/SnO_2$ of 2.0).

Subsequently, 2.9 g of diisopropylamine was added to the resulting aqueous dispersion of silicon dioxide-stannate composite oxide colloidal particles. The resulting dispersion was an alkaline aqueous dispersion of silicon dioxide-stannate composite oxide colloidal particles, and had a pH of 8.2 and colloidal particles with an average primary particle diameter of from 1 nm to 4 nm. The alkaline silicon dioxide-stannate composite oxide colloidal particles (B) obtained were used as colloidal particles as a coating described later.

Next, 570 g of the silicon dioxide-stannate composite oxide (B) as a coating was added while stirring to 1900 g of the aqueous dispersion of the titanium oxide-containing core particles (A), and the mixture was kept at a temperature of 95° C. for 3 h to produce an aqueous dispersion of titanium oxide-containing oxide colloidal particles (C). Then, the resulting aqueous dispersion of modified titanium oxide colloidal particles was made to pass through a column packed with a hydrogen-type cation exchange resin (Amberlite IR-120B) to give 2730 g of aqueous dispersion of acidic titanium oxide-containing oxide colloidal particles. The resulting dispersion had a pH of 2.7 and a total metal oxide concentration of 4.0% by mass. After that, 5.1 g of tripentylamine was added to the resulting dispersion. Subsequently, the tripentylamine-containing dispersion was put into an evaporator with a recovery flask and was concentrated, and water was distilled off at 600 Torr while methanol was added to yield 533 g of methanol dispersion of titanium oxide-containing oxide colloidal particles (C). The resulting methanol dispersion had a pH of 6.0 (when diluted with water having the same mass as of the dispersion), a total metal oxide concentration of 20.5% by mass, and a water content of 3.1%. The average primary particle diameter measured by a transmission electron microscope was from 8 nm to 18 nm, and the average particle diameter measured by dynamic light scattering (DLS) (dynamic light scattering particle size) was 15 nm.

Next, 6.9 g of 3-methacryloyloxypropyltrimethoxysilane (3-methacryloxypropyltrimethoxysilane, manufactured by Shin-Etsu Chemical Co., Ltd.) was added to 400 g of the resulting methanol dispersion of titanium oxide-containing oxide colloidal particles (C). The mixture was heated under reflux at 70° C. for 5 h and the 3-methacryloyloxypropyl group was bonded to the surfaces to give a methanol dispersion of modified titanium oxide-containing oxide colloidal particles.

Then, methanol was replaced with cyclohexanone by distilling off methanol while adding cyclohexanone by using an evaporator at 150 Torr to produce 210 g of cyclohexanone (containing 10% by mass of methanol) dispersion of modified titanium oxide-containing oxide colloidal particles where the 3-methacryloyloxypropyl group was bonded to the surfaces (hereinafter, referred to as modified titanium oxide colloidal particle dispersion 1). The resulting cyclohexanone (containing 10% by mass of methanol) dispersion had a pH of 5.9 (when diluted with water and methanol having the same mass as of the dispersion), and a total metal oxide concentration of 40.0% by mass.

Production Example 3

<Synthesizing Modified Titanium Oxide Colloidal Particle Dispersion 2>

First, 6.9 g of 3-methacryloyloxypropyltrimethoxysilane (manufactured by Shin-Etsu Chemical Co., Ltd.) was added to 400 g of the methanol dispersion of titanium oxide-containing oxide colloidal particles (C) as produced by substantially the same procedure as in Production Example 2. The mixture was heated under reflux at 70° C. for 5 h and the 3-methacryloyloxypropyl group was bonded to the surfaces to give a methanol dispersion of modified titanium oxide-containing oxide colloidal particles.

Next, methanol was replaced with cyclohexanone by distilling off methanol while adding cyclohexanone by using an evaporator at 150 Torr to produce 210 g of cyclohexanone (containing 20% by mass of methanol) dispersion of modified titanium oxide-containing oxide colloidal particles where the 3-methacryloyloxypropyl group was bonded to the surfaces (hereinafter, referred to as modified titanium oxide colloidal particle dispersion 2). The resulting cyclohexanone (containing 20% by mass of methanol) dispersion had a pH of 5.9 (when diluted with water and methanol having the same mass as of the dispersion), and a total metal oxide concentration of 40.0% by mass.

Production Example 4

<Synthesizing Modified Titanium Oxide Colloidal Particle Dispersion 3>

First, 6.9 g of 3-methacryloyloxypropyltrimethoxysilane (manufactured by Shin-Etsu Chemical Co., Ltd.) was added to 400 g of the methanol dispersion of titanium oxide-containing oxide colloidal particles (C) as produced by substantially the same procedure as in Production Example 2. The mixture was heated under reflux at 70° C. for 5 h and the 3-methacryloyloxypropyl group was bonded to the surfaces to give a methanol dispersion of modified titanium oxide-containing oxide colloidal particles.

Next, methanol was replaced with methyl ethyl ketone by distilling off methanol while adding methyl ethyl ketone by using an evaporator at 150 Torr to produce 280 g of methyl ethyl ketone dispersion of modified titanium oxide-containing oxide colloidal particles where the 3-methacryloyloxypropyl group was bonded to the surfaces (hereinafter, referred to as modified titanium oxide colloidal particle dispersion 3). The resulting methyl ethyl ketone dispersion had a pH of 6.1 (when diluted with water and methanol having the same mass as of the dispersion) and a total metal oxide concentration of 30.0% by mass.

Production Example 5

<Synthesizing Modified Titanium Oxide Colloidal Particle Dispersion 4>

First, 5.5 g of phenyltrimethoxysilane (manufactured by Shin-Etsu Chemical Co., Ltd.) was added to 400 g of the methanol dispersion of titanium oxide-containing oxide colloidal particles (C) as produced by substantially the same procedure as in Production Example 2. The mixture was heated under reflux at 70° C. for 5 h and the phenyl group was bonded to the surfaces to give a methanol dispersion of modified titanium oxide-containing oxide colloidal particles.

Next, methanol was replaced with methyl ethyl ketone by distilling off methanol while adding methyl ethyl ketone by using an evaporator at 150 Torr to produce 280 g of methyl ethyl ketone dispersion of modified titanium oxide-containing oxide colloidal particles where the phenyl group was bonded to the surfaces (hereinafter, referred to as modified titanium oxide colloidal particle dispersion 4). The resulting methyl ethyl ketone dispersion had a pH of 5.5 (when diluted with water and methanol having the same mass as of the dispersion) and a total metal oxide concentration of 30.0% by mass.

Production Example 6

<Synthesizing Modified Titanium Oxide Colloidal Particle Dispersion 5>

First, 5.8 g of hexyltrimethoxysilane (manufactured by Shin-Etsu Chemical Co., Ltd.) was added to 400 g of the methanol dispersion of titanium oxide-containing oxide colloidal particles (C) as produced by substantially the same procedure as in Production Example 2. The mixture was heated under reflux at 70° C. for 5 h and the hexyl group was bonded to the surfaces to give a methanol dispersion of modified titanium oxide-containing oxide colloidal particles.

Next, methanol was replaced with methyl ethyl ketone by distilling off methanol while adding methyl ethyl ketone by using an evaporator at 150 Torr to produce 280 g of methyl ethyl ketone dispersion of modified titanium oxide-containing oxide colloidal particles where the hexyl group was bonded to the surfaces (hereinafter, referred to as modified titanium oxide colloidal particle dispersion 5). The resulting methyl ethyl ketone dispersion had a pH of 5.8 (when diluted with water and methanol having the same mass as of the dispersion) and a total metal oxide concentration of 30.0% by mass.

Production Example 7

<Synthesizing Modified Titanium Oxide Colloidal Particle Dispersion 6>

First, 16.8 g of polyether-modified silane(3-[methoxy (polyethyleneoxy)n-propyl]trimethoxysilane (n=from 5 to 15)) (manufactured by Shin-Etsu Chemical Co., Ltd.) was added to 400 g of the methanol dispersion of titanium oxide-containing oxide colloidal particles (C) as produced by substantially the same procedure as in Production Example 2. The mixture was heated under reflux at 70° C. for 5 h and the polyether group was bonded to the surfaces to give a methanol dispersion of modified titanium oxide-containing oxide colloidal particles.

Next, methanol was replaced with methyl ethyl ketone by distilling off methanol while adding methyl ethyl ketone by using an evaporator at 150 Torr to produce 280 g of methyl ethyl ketone dispersion of modified titanium oxide-containing oxide colloidal particles where the polyether group was bonded to the surfaces (hereinafter, referred to as modified titanium oxide colloidal particle dispersion 6). The resulting methyl ethyl ketone dispersion had a pH of 6.4 (when diluted with water and methanol having the same mass as of the dispersion) and a total metal oxide concentration of 30.0% by mass.

Production Example 8

<Synthesizing Titanium Oxide Colloidal Particle Dispersion 7>

First, 2600 g of the dispersion of titanium oxide-containing core particles (A) as produced by substantially the same method as in Production Example 2 was put into an evaporator with a recovery flask and was concentrated. Water was distilled off at 600 Torr while methanol was added to obtain 533 g of methanol dispersion of titanium oxide-containing core particles (A). The resulting methanol dispersion had a pH of 4.1, a total metal oxide concentration of 20.5% by mass, and a water content of 3.0%.

To 400 g of the resulting methanol dispersion of titanium oxide-containing core particles (A) was added 6.9 g of 3-methacryloyloxypropyltrimethoxysilane. The mixture was heated under reflux at 70° C. for 5 h to yield a methanol dispersion of modified titanium oxide-containing core particles where the 3-methacryloyloxypropyl group was bonded to the surfaces.

Next, methanol was replaced with methyl ethyl ketone by distilling off methanol while adding methyl ethyl ketone by using an evaporator at 150 Torr to produce 280 g of methyl ethyl ketone dispersion of modified titanium oxide-containing core particles where the 3-methacryloyloxypropyl group was bonded to the surfaces (hereinafter, referred to as titanium oxide colloidal particle dispersion 7). The resulting methyl ethyl ketone dispersion had a pH of 4.2 (when diluted with water and methanol having the same mass as of the dispersion) and a total metal oxide concentration of 30.0% by mass.

Example 1

First, 2 g of the reactive silicone compound-containing mixed solution prepared in Production Example 1 was dissolved in 3 g of cyclohexanone, and 5 g of the modified titanium oxide colloidal particle dispersion 1 prepared in Production Example 2 was added thereto and mixed to prepare a pale yellow, transparent reactive silicone composition 1. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 100 phr. The test designated as (1) above was carried out on the reactive silicone composition 1 obtained. Table 1 [Table 1-1, Table 1-2] shows the evaluation results.

This reactive silicone composition 1 was applied onto a glass substrate by using a spin coater at a rotation speed of 2000 rpm, desolvated by heating at 100° C. for 10 min on a hot plate, and further irradiated with UV light at 0.89 W/cm$^2$ for 3 min to produce a cured film. The resulting cured film was subjected to the tests designated as (2) to (5) above. Table 1 [Table 1-1] shows the evaluation results.

Example 2

Except that the rotation speed of the spin coater when the reactive silicone composition 1 described in Example 1 [the blending amount of the modified titanium-containing oxide colloidal particles with respect to the mass of the reactive silicone compound-containing mixed solution (total mass of the reactive silicone compound, the reactive diluent, and the initiator) was 100 phr] was applied onto a glass substrate was changed to 1000 rpm, substantially the same conditions described in Example 1 were used for solvent removal and UV irradiation to produce and evaluate the resulting cured film. Table 1 [Table 1-1] shows the evaluation results obtained.

Example 3

Except that the rotation speed of the spin coater when the reactive silicone composition 1 described in Example 1 [the blending amount of the modified titanium-containing oxide colloidal particles with respect to the mass of the reactive silicone compound-containing mixed solution (total mass of the reactive silicone compound, the reactive diluent, and the initiator) was 100 phr] was applied onto a glass substrate was changed to 500 rpm, substantially the same conditions described in Example 1 were used for solvent removal and UV irradiation to produce and evaluate the resulting cured film. Table 1 [Table 1-1] shows the evaluation results obtained.

Example 4

First, 3.2 g of the reactive silicone compound-containing mixed solution prepared in Production Example 1 was dissolved in 4.8 g of cyclohexanone, and 2 g of the modified titanium oxide colloidal particle dispersion 1 prepared in Production Example 2 was added thereto and mixed to prepare a pale yellow, transparent reactive silicone composition 2. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 25 phr. The test designated as (1) above was carried out on the reactive silicone composition 2 obtained. Table 1 [Table 1-1] shows the evaluation results.

Except that the rotation speed of the spin coater when this reactive silicone composition 2 was applied onto a glass substrate was changed to 500 rpm, substantially the same conditions described in Example 1 were used for solvent removal and UV irradiation to produce and evaluate the resulting cured film. Table 1 [Table 1-1] shows the evaluation results obtained.

Example 5

First, 0.8 g of the reactive silicone compound-containing mixed solution prepared in Production Example 1 was dissolved in 1.2 g of cyclohexanone, and 8 g of the modified titanium oxide colloidal particle dispersion 1 prepared in Production Example 2 was added thereto and mixed to prepare a pale yellow, transparent reactive silicone composition 3. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 400 phr. The test designated as (1) above was carried out on the reactive silicone composition 3 obtained. Table 1 [Table 1-1] shows the evaluation results.

Except that the rotation speed of the spin coater when this reactive silicone composition 3 was applied onto a glass substrate was changed to 500 rpm, substantially the same conditions described in Example 1 were used for solvent removal and UV irradiation to produce and evaluate the resulting cured film. Table 1 [Table 1-1] shows the evaluation results obtained.

Example 6

First, 2 g of the reactive silicone compound-containing mixed solution prepared in Production Example 1 was dissolved in 2.4 g of cyclohexanone and 0.6 g of methanol, and 5 g of the modified titanium oxide colloidal particle dispersion 2 prepared in Production Example 3 was added thereto and mixed to prepare a pale yellow, transparent reactive silicone composition 4. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 100 phr. The test designated as (1) above was carried out on the reactive silicone composition 4 obtained. Table 1 [Table 1-1] shows the evaluation results.

This reactive silicone composition 4 was applied onto a glass substrate by using a spin coater at a rotation speed of 1000 rpm, desolvated by heating at 100° C. for 10 min on a hot plate, and further heated at 120° C. for 2 h to produce and evaluate the resulting cured film. Table 1 [Table 1-1] shows the evaluation results obtained.

Example 7

First, 3.2 g of the reactive silicone compound-containing mixed solution prepared in Production Example 1 was dissolved in 3.84 g of cyclohexanone and 0.96 g of methanol, and 2 g of the modified titanium oxide colloidal particle dispersion 2 prepared in Production Example 3 was added thereto and mixed to prepare a pale yellow, transparent reactive silicone composition 5. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 25 phr. The test designated as (1) above was carried out on the reactive silicone composition 5 obtained. Table 1 shows the evaluation results.

This reactive silicone composition 5 was likewise applied onto a glass substrate, desolvated, and heated under the conditions described in Example 6 to produce and evaluate the resulting cured film. Table 1 [Table 1-1] shows the evaluation results obtained.

Example 8

First, 0.8 g of the reactive silicone compound-containing mixed solution prepared in Production Example 1 was dissolved in 0.96 g of cyclohexanone and 0.24 g of methanol, and 8 g of the modified titanium oxide colloidal particle dispersion 2 prepared in Production Example 3 was added thereto and mixed to prepare a pale yellow, transparent reactive silicone composition 6. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 400 phr. The test designated as (1) above was carried out on the reactive silicone composition 6 obtained. Table 1 [Table 1-1] shows the evaluation results.

This reactive silicone composition 6 was likewise applied onto a glass substrate, desolvated, and heated under the conditions described in Example 6 to produce and evaluate the resulting cured film. Table 1 [Table 1-1] shows the evaluation results obtained.

Example 9

First, 1.5 g of the reactive silicone compound-containing mixed solution prepared in Production Example 1 was dissolved in 3.5 g of methyl ethyl ketone, and 5 g of the modified titanium oxide colloidal particle dispersion 3 prepared in Production Example 4 was added thereto and mixed to prepare a pale yellow, transparent reactive silicone composition 7. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 100 phr. The test designated as (1) above was carried out on the reactive silicone composition 7 obtained. Table 1 [Table 1-2] shows the evaluation results.

This reactive silicone composition 7 was likewise applied onto a glass substrate, desolvated, and heated under the conditions described in Example 6 to produce and evaluate the resulting cured film. Table 1 [Table 1-2] shows the evaluation results obtained.

Example 10

First, 0.6 g of the reactive silicone compound-containing mixed solution prepared in Production Example 1 was dissolved in 1.4 g of methyl ethyl ketone, and 8 g of the modified titanium oxide colloidal particle dispersion 3 prepared in Production Example 4 was added thereto and mixed to prepare a pale yellow, transparent reactive silicone composition 8. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 400 phr. The test designated as (1) above was carried out on the reactive silicone composition 8 obtained. Table 1 [Table 1-2] shows the evaluation results.

This reactive silicone composition 8 was likewise applied onto a glass substrate, desolvated, and heated under the conditions described in Example 6 to produce and evaluate the resulting cured film. Table 1 [Table 1-2] shows the evaluation results obtained.

Example 11

First, 2.4 g of the reactive silicone compound-containing mixed solution prepared in Production Example 1 was dissolved in 5.6 g of methyl ethyl ketone, and 2 g of the modified titanium oxide colloidal particle dispersion 4 prepared in Production Example 5 was added thereto and mixed to prepare a pale yellow, transparent reactive silicone composition 9. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 25 phr. The test designated as (1) above was carried out on the reactive silicone composition 9 obtained. Table 1 [Table 1-2] shows the evaluation results.

This reactive silicone composition 9 was likewise applied onto a glass substrate, desolvated, and heated under the conditions described in Example 6 to produce and evaluate the resulting cured film. Table 1 [Table 1-2] shows the evaluation results obtained.

Example 12

First, 2.4 g of the reactive silicone compound-containing mixed solution prepared in Production Example 1 was dissolved in 5.6 g of methyl ethyl ketone, and 2 g of the modified titanium oxide colloidal particle dispersion 5 prepared in Production Example 6 was added thereto and mixed to prepare a pale yellow, transparent reactive silicone composition 10. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 25 phr. The test designated as (1) above was carried out on the reactive silicone composition 10 obtained. Table 1 [Table 1-2] shows the evaluation results.

This reactive silicone composition 10 was likewise applied onto a glass substrate, desolvated, and heated under the conditions described in Example 6 to produce and evaluate the resulting cured film. Table 1 [Table 1-2] shows the evaluation results obtained.

Example 13

First, 2.4 g of the reactive silicone compound-containing mixed solution prepared in Production Example 1 was dissolved in 5.6 g of methyl ethyl ketone, and 2 g of the modified titanium oxide colloidal particle dispersion 6 prepared in Production Example 7 was added thereto and mixed to prepare a pale yellow, transparent reactive silicone composition 11. Here, the blending amount of the modified titanium-containing oxide colloidal particles (in terms of all the metal oxides) with respect to the mass of the reactive silicone compound-containing mixed solution (total mass of the reactive silicone compound, the reactive diluent, and the initiator) was 25 phr. The test designated as (1) above was carried out on the reactive silicone composition 11 obtained. Table 1 [Table 1-2] shows the evaluation results.

This reactive silicone composition 11 was likewise applied onto a glass substrate, desolvated, and heated under the conditions described in Example 6 to produce and evaluate the resulting cured film. Table 1 [Table 1-2] shows the evaluation results obtained.

Comparative Example 1

First, 4 g of the reactive silicone compound-containing mixed solution prepared in Production Example 1 was dissolved in 5.7 g of cyclohexanone and 0.3 g of methanol to prepare a colorless, transparent Comparative Example composition 1. The test designated as (1) above was carried out on the Comparative Example composition 1 obtained. Table 1 [Table 1-2] shows the evaluation results.

Except that the rotation speed of the spin coater when this Comparative Example composition 1 was applied onto a glass substrate was changed to 500 rpm, substantially the same conditions described in Example 1 were used for solvent removal and UV irradiation to produce and evaluate the resulting cured film. Table 1 [Table 1-2] shows the evaluation results obtained.

Comparative Example 2

First, 1.5 g of the reactive silicone compound-containing mixed solution prepared in Production Example 1 was dissolved in 3.5 g of methyl ethyl ketone, and 5 g of the titanium oxide colloidal particle dispersion 7 prepared in Production Example 8 was added thereto and mixed to prepare a pale yellow, transparent Comparative Example composition 2. Here, the blending amount of the titanium oxide-containing core particles (in terms of all the metal oxides) with respect to the mass of the reactive silicone compound-containing mixed solution (total mass of the reactive silicone compound, the reactive diluent, and the initiator) was 100 phr. The test designated as (1) above was carried out on the Comparative Example composition 2 obtained. Table 1 [Table 1-2] shows the evaluation results.

This Comparative Example composition 2 was likewise applied, desolvated, and heated under the conditions described in Example 6 to produce and evaluate the resulting cured film. Table 1 [Table 1-2] shows the evaluation results obtained.

TABLE 1-1

| | Example 1 | Example 2 | Example 3 | Example 4 | Example 5 | Example 6 | Example 7 | Example 8 |
|---|---|---|---|---|---|---|---|---|
| Particle blending amount* [phr] | 100 | 100 | 100 | 25 | 400 | 100 | 25 | 400 |
| Storage stability [5° C., 1 day] | A | A | A | A | A | A | A | A |
| Infrared transmittance | Over 95% | Over 95% | Over 95% | Over 95% | Over 95% | Over 95% | Over 95% | Over 95% |

TABLE 1-1-continued

|  | Example 1 | Example 2 | Example 3 | Example 4 | Example 5 | Example 6 | Example 7 | Example 8 |
|---|---|---|---|---|---|---|---|---|
| Haze value | 2.0 or less | 2.0 or less | 2.0 or less | 2.0 or less | 2.0 or less | 2.0 or less | 2.0 or less | 2.0 or less |
| Light resistance | A | A | A | A | A | A | A | A |
| Film thickness [μm] | 1.3 | 2.2 | 3.4 | 2.8 | 4.0 | 1.0 | 1.1 | 1.0 |
| Refractive index [—] | 1.74 | 1.74 | 1.74 | 1.65 | 1.91 | 1.75 | 1.65 | 1.92 |

*The blending amount of the respective particles (in terms of all the metal oxides) with respect to the reactive silicone compound-containing mixed solution (total mass of the reactive silicone compound, the reactive diluent, and the initiator)

TABLE 1-2

|  | Example 9 | Example 10 | Example 11 | Example 12 | Example 13 | Comparative Example 1 | Comparative Example 2 |
|---|---|---|---|---|---|---|---|
| Particle blending amount [phr] | 100 | 400 | 25 | 25 | 25 | 0 | 100 |
| Storage stability [5° C., 1 day] | A | A | A | A | A | A | N |
| Infrared transmittance | Over 95% | Over 95% | From more than 90% to 95% | From more than 90% to 95% | From more than 90% to 95% | Over 95% | From more than 90% to 95% |
| Haze value | 2.0 or less | 2.0 or less | From more than 2.0 to 5.0 | From more than 2.0 to 5.0 | From more than 2.0 to 5.0 | 2.0 or less | From more than 2.0 to 5.0 |
| Light resistance | A | A | A | A | A | A | N |
| Film thickness [μm] | 2.3 | 2.4 | 1.4 | 1.3 | 1.1 | 2.1 | 5.1 |
| Refractive index [—] | 1.75 | 1.92 | 1.66 | 1.67 | 1.66 | 1.61 | 1.77 |

* The blending amount of the respective particles (in terms of all the metal oxides) with respect to the reactive silicone compound-containing mixed solution (total mass of the reactive silicone compound, the reactive diluent, and the initiator)

[Evaluation Results]

The results shown in Table 1 (Table 1-1, Table 1-2) have demonstrated that the reactive silicone compositions 1 to 11 prepared and used in Examples 1 to 13 have higher storage stability than the Comparative Example composition 2 prepared and used in Comparative Example 2. In addition, the results also have demonstrated that the cured films produced in Examples 1 to 13 exhibit high transmittance in the infrared region and a low haze value, remain highly transparent, and have excellent light resistance. The results have further demonstrated that the cured films produced in Examples 1 to 13 exhibit a higher refractive index than in Comparative Example 1, and the refractive index was increased by blending the modified titanium oxide-containing oxide colloidal particles; and the refractive index can be adjusted such that the refractive index is changed by how much the modified titanium oxide-containing oxide colloidal particles are blended.

The invention claimed is:

1. A reactive silicone composition comprising component (S) and component (T),
   wherein the component(S) comprises a reactive silicone compound comprising a condensation product of a diaryl silicate compound represented by Formula [1] and a silicon compound represented by Formula [2], $$Ar^1 - \underset{\underset{OH}{|}}{\overset{\overset{OH}{|}}{Si}} - Ar^2 \quad [1]$$

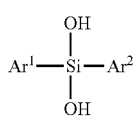

[2]

wherein $Ar^1$ and $Ar^2$ each independently represent a phenyl group optionally substituted by a $C_{1-6}$ alkyl group and X represents a hydrolyzable reactive group, and
   wherein the component (T) comprises modified titanium oxide-containing oxide colloidal particles produced by bonding an organosilicon compound to surfaces of titanium oxide-containing oxide colloidal particles (C) having an average particle diameter of from 2 nm to 100 nm and comprising, as a core, titanium oxide-containing metal oxide colloidal particles (A) having an average primary particle diameter of from 2 nm to 60 nm, surfaces of which are coated with a coating comprising silicon dioxide-containing and tin oxide-containing composite oxide colloidal particles (B) having an average primary particle diameter of from 1 nm to 4 nm, and wherein the modified titanium oxide-containing oxide colloidal particles comprise no intermediate film layer between the coating and the core such that the coating is directly on the core.

2. The reactive silicone composition according to claim 1, further comprising cyclohexanone or methyl ethyl ketone as a solvent.

3. The reactive silicone composition according to claim 1, further comprising a polymerization initiator.

4. A cured product formed from the reactive silicone composition according to claim 1.

5. A core member in an optical signal transmission device, comprising the cured product according to claim 4.

6. An optical adhesive used for a joint between optical waveguides or a joint between an optical waveguide and a light-receiving element in an optical signal transmission device, the optical adhesive comprising the reactive silicone composition according to claim 1.

7. A film forming agent comprising the reactive silicone composition according to claim 1.

8. An optical member comprising, on a surface of an optical base material, a cured film formed from the reactive silicone composition according to claim 1.

9. The optical member according to claim 8, wherein an antireflection film is further applied onto the cured film.

* * * * *